(12) United States Patent
Chang

(10) Patent No.: US 9,290,050 B2
(45) Date of Patent: Mar. 22, 2016

(54) LEG LIFTING MECHANISM FOR TABLE SAW

(71) Applicant: Chin-Chin Chang, Taichung (TW)

(72) Inventor: Chin-Chin Chang, Taichung (TW)

(*) Notice: Subject to any disclaimer, the term of this patent is extended or adjusted under 35 U.S.C. 154(b) by 249 days.

(21) Appl. No.: 14/057,208

(22) Filed: Oct. 18, 2013

(65) Prior Publication Data

US 2015/0108418 A1   Apr. 23, 2015

(51) Int. Cl.
*B27B 5/16* (2006.01)
*B27B 5/10* (2006.01)
*B60B 33/06* (2006.01)
*B25H 1/00* (2006.01)
*B25H 1/04* (2006.01)
*B62B 5/00* (2006.01)

(52) U.S. Cl.
CPC ............... *B60B 33/066* (2013.01); *B25H 1/04* (2013.01); *B27B 5/10* (2013.01); *B27B 5/16* (2013.01); *B62B 5/0083* (2013.01)

(58) Field of Classification Search
CPC .......... B25B 5/10; B25B 5/16; A47B 91/002; B25H 1/04; B62B 5/049; B62B 5/0083
See application file for complete search history.

(56) References Cited

U.S. PATENT DOCUMENTS

| 6,079,931 A * | 6/2000 | English, Jr. ........... B62B 5/0083 254/8 R |
| 6,311,992 B1 * | 11/2001 | Theising ............... B62B 5/0083 280/43.13 |
| 6,997,466 B2 * | 2/2006 | Wang ....................... B25H 1/04 16/34 |
| 7,584,935 B2 * | 9/2009 | Chen ....................... B62B 5/049 248/647 |
| 8,246,059 B2 * | 8/2012 | Gass ........................ F16M 3/00 248/651 |
| 2002/0043776 A1 * | 4/2002 | Chuang ..................... 280/43.24 |
| 2009/0174162 A1 * | 7/2009 | Gass ..................... B62B 5/0083 280/79.11 |
| 2015/0059546 A1 * | 3/2015 | Chang ..................... B27B 27/02 83/438 |

* cited by examiner

*Primary Examiner* — Lee D Wilson
*Assistant Examiner* — Seahee Yoon

(57) ABSTRACT

A leg lifting mechanism for a table saw including a circular saw blade extending upward from an upper cutting surface, and a base mounted under a stand, the base having first and second leg assemblies, a first wheel assembly pivotably secured to the first leg assembly, and at least two second wheel assemblies secured to the second leg assembly is provided with a foot pedal including two side flanks pivotably secured to the first leg assembly, each of the side flanks having a straight edge and a cam edge. Clockwise rotation of the foot pedal about the first wheel assembly inward moves the cam edges on top of the first wheel assembly until portions of the straight edges grappingly engage the top of the first wheel assembly and portions of the first and second leg assemblies are lifted above the supporting surface.

1 Claim, 12 Drawing Sheets

LEG LIFTING MECHANISM FOR TABLE SAW

BACKGROUND OF THE INVENTION

1. Field of the Invention

The invention relates to table saws and more particularly to a cam foot pedal which can be pivoted clockwise to a lock position to lift a right leg structure so that a mobile table saw then can be moved by wheeling.

2. Description of Related Art

It is well known to provide wheeled devices (e.g., carts) with mechanisms for locking the wheels thereof so as to prevent the cart from moving except at the urging of a user. There have been attempts to address this deficiency of conventional locking mechanism for wheeled devices. For example, U.S. Pat. No. 8,511,693 discloses a mobile base that attaches to the stand of a table saw. The mobile base includes wheels and casters that rotate down and lift the saw when a foot pedal is depressed. The mobile base raises the saw asymmetrically to provide clearance for the legs of an extension table attached to the table of the saw. A locking mechanism locks the wheels and casters so that they do not retract while the saw is moved, and a foot-operated lever releases the wheels and casters so that they may retract and lower the saw back to the ground.

The motor of the table saw is a carbonic acid-based motor which is light in nature. Thus, U.S. Pat. No. 8,511,693 is not applicable to heavy table saws. Therefore, there is a need for a novel lifting mechanism mounted on a wheeled base for lifting a heavy table saw prior to moving it.

SUMMARY OF THE INVENTION

It is therefore one object of the invention to provide a leg lifting mechanism for a table saw including a stand; an upper cutting surface mounted on the stand; a circular saw blade extending upward from the upper cutting surface; and a base mounted under the stand, the base having first and second leg assemblies, a first wheel assembly pivotably secured to the first leg assembly, and at least two second wheel assemblies secured to the second leg assembly, comprising a foot pedal including two side flanks pivotably secured to the first leg assembly, each of the side flanks having a straight edge and a cam edge; wherein the first and second wheel assemblies and a portion of the first and second leg assemblies are rested on a supporting surface in a ready to use position; and wherein clockwise rotation of the foot pedal about the first wheel assembly inward moves the cam edges on a top of the first wheel assembly until portions of the straight edges grappingly engage the top of the first wheel assembly and the portion of the first and second leg assemblies is lifted above the supporting surface in a ready to move position.

The above and other objects, features and advantages of the invention will become apparent from the following detailed description taken with the accompanying drawings.

DETAILED DESCRIPTION OF THE INVENTION

Figure 1:
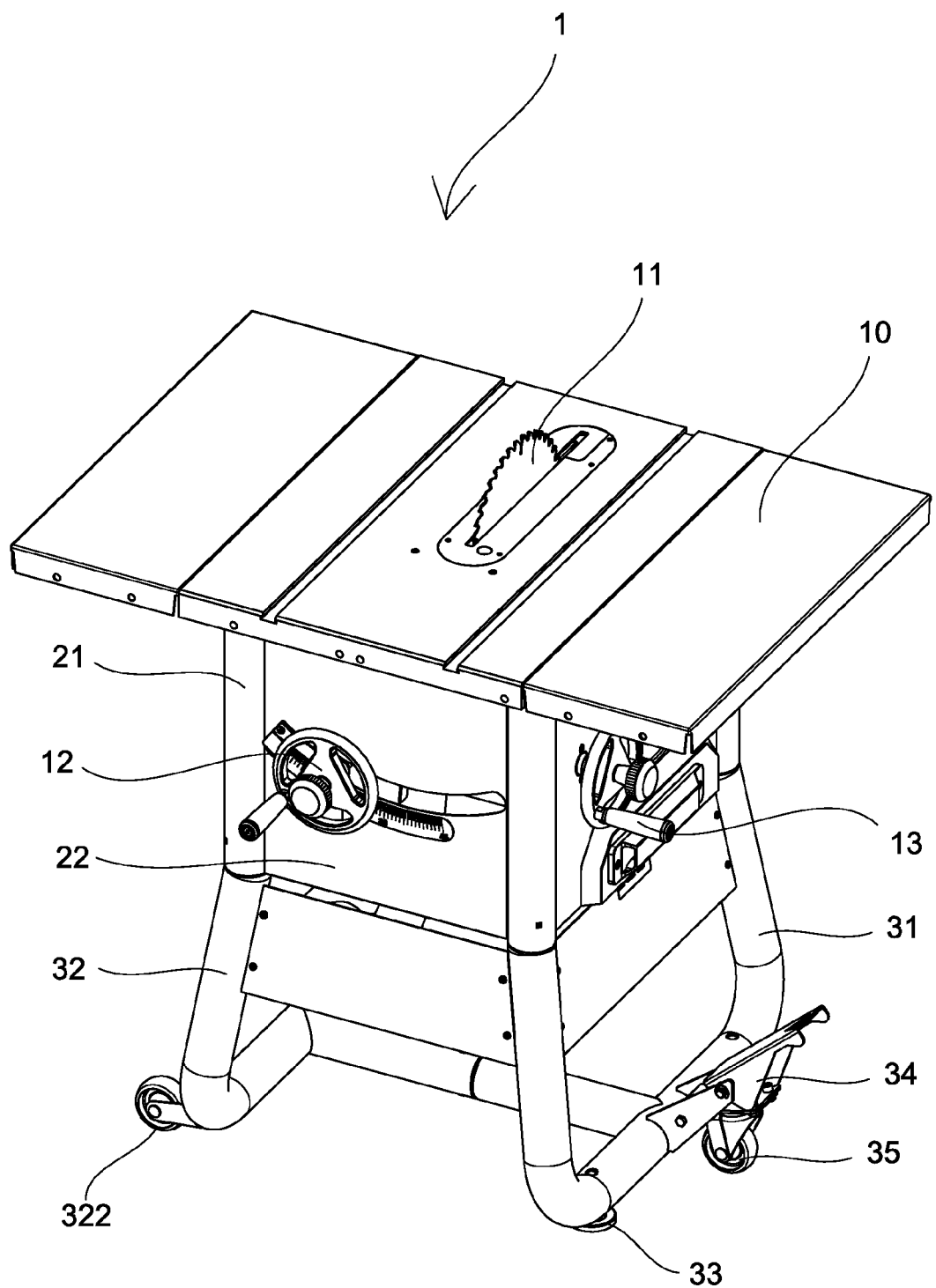
FIG. 1 is a perspective view of a mobile table saw according to the invention.
Figure 2:
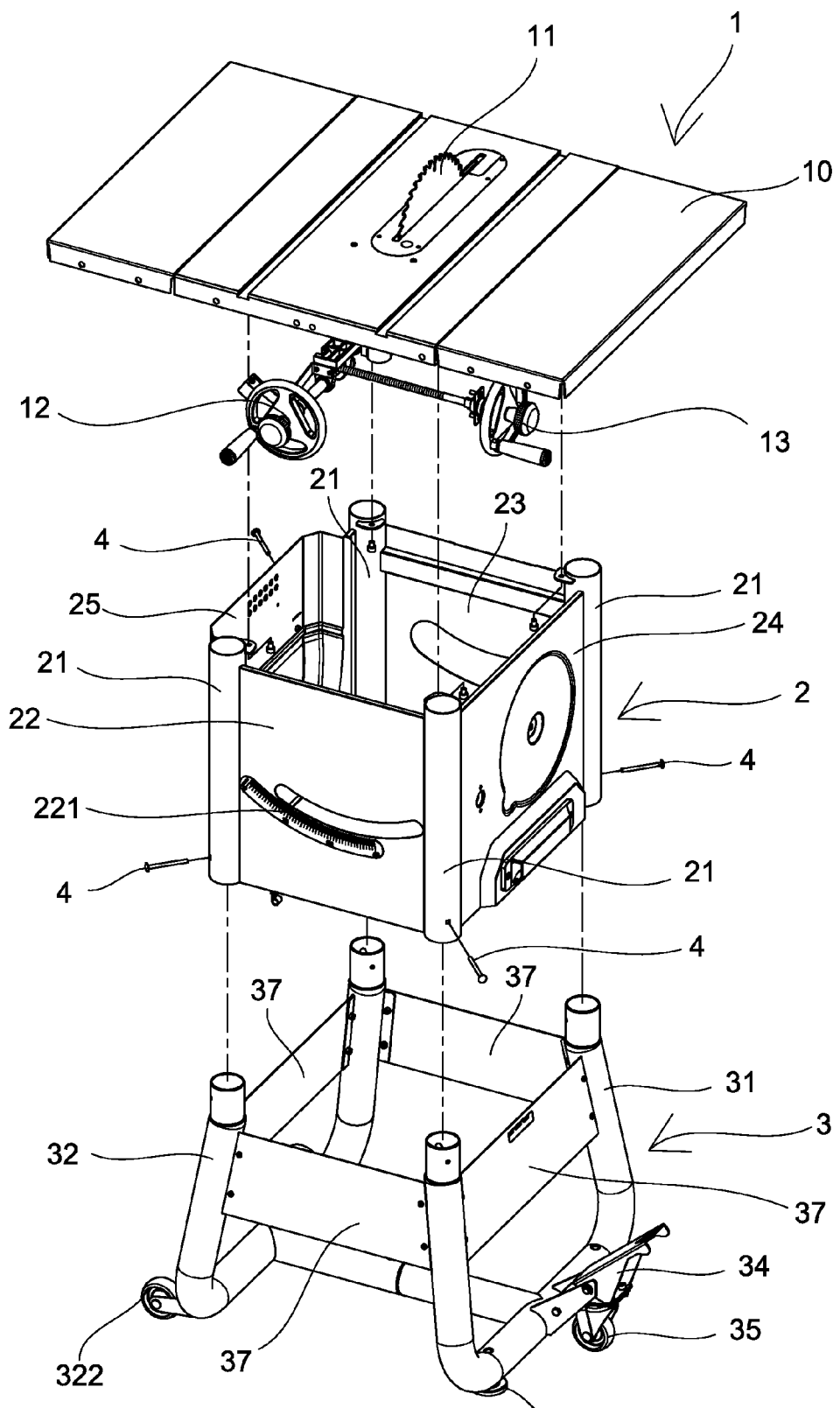
FIG. 2 is an exploded perspective view of the mobile table saw.
Figure 3:
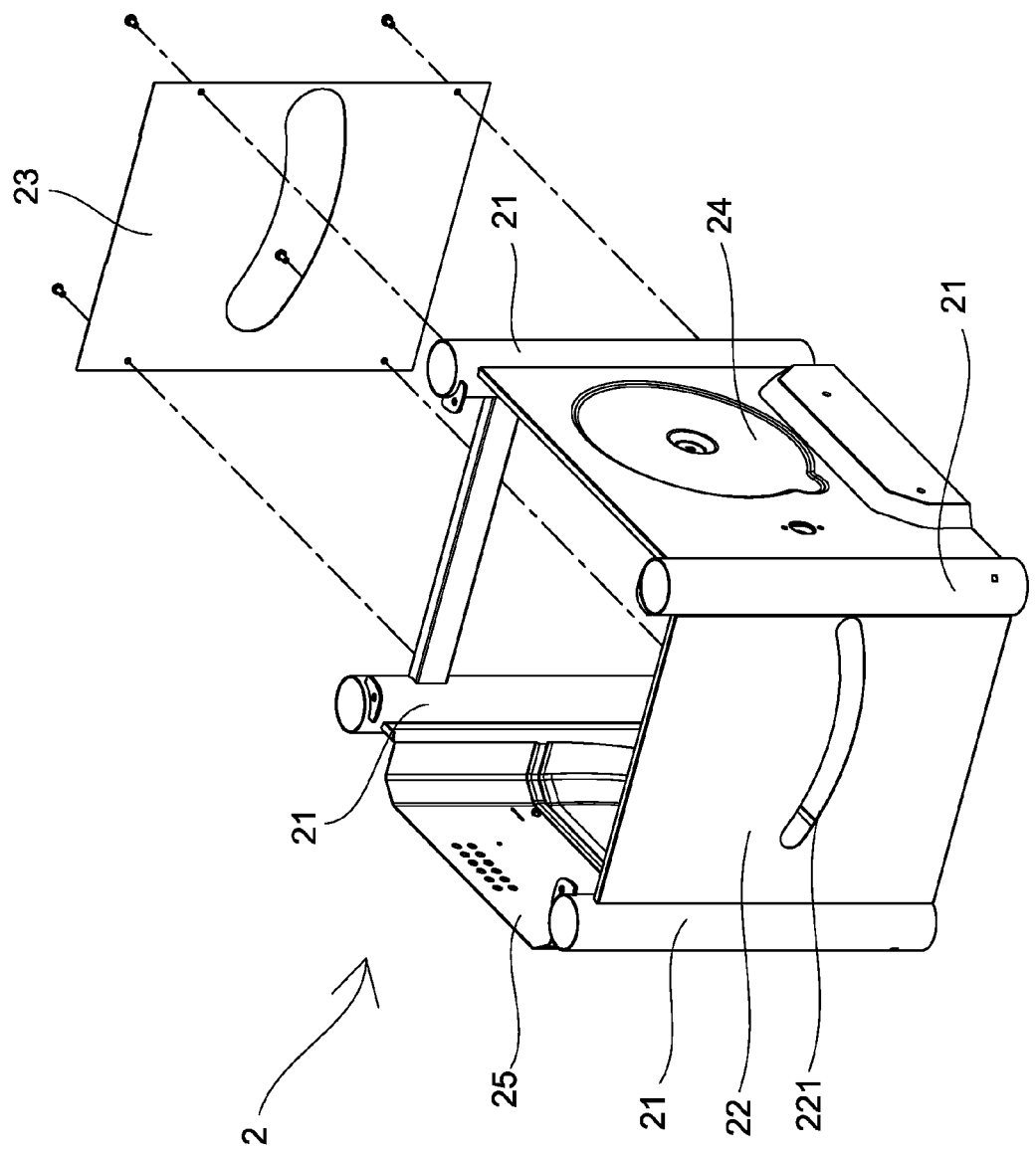
FIG. 3 is an exploded perspective view of an upper portion of the base.
Figure 4:
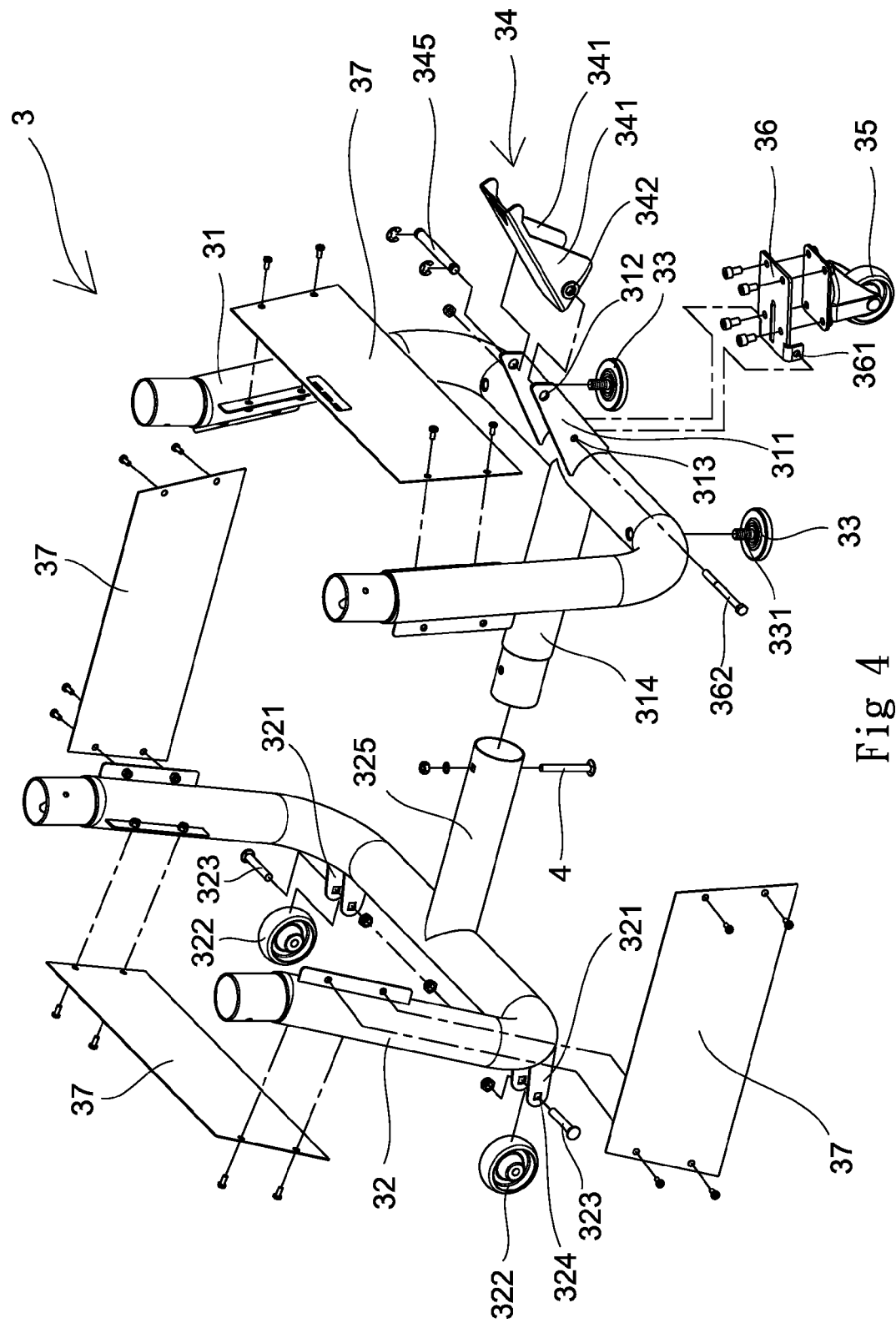
FIG. 4 is an exploded view of a lower portion of the base.

Referring to FIGS. 1 to 8A, a mobile table saw 1 in accordance with the invention is shown. The mobile table saw 1 has a weight more than 450 pounds because among other things, one of its components such as motor is an induction motor which is heavy in nature. Thus, the mobile table saw 1 is required to be structurally strong. The mobile table saw 1 comprises the following components as discussed in detail below.

A stand 2, a base 3 mounted under the stand 2, an upper cutting surface 10 mounted on the stand 2, an elevating mechanism 12 mounted on a curved slot 221 of a front panel 22 of the stand 2, a rotating mechanism 13 mounted on a right panel 24, and a circular saw blade 11 extending upward from the upper cutting surface 10 to be adapted to cut a substance, e.g., wood.

The stand 2 includes four upright members (implemented as tubular bumpers) 21, the front panel 22, a rear panel 23, a right panel 24, and a left panel 25. Each of the panels 22 to 25 are fastened between any two adjacent upright members 21. Tops of the upright members 21 are secured to a bottom of the upper cutting surface 10.

The base 3 includes a right leg structure 31 having tops threadedly secured to lower portions of the two upright members 21 by using fasteners 4, a transverse bar 314 extending inward from a center of a lower part, and two parallel brackets 311 extending outward from the center of the lower part; two feet 33 each having an externally threaded shank 331 adapted to threadedly, adjustably secure to bottoms of the ends of the lower part respectively for accommodating irregularities of the supporting ground; a left leg structure 32 having tops threadedly secured to lower portions of the other two upright members 21 by using fasteners 4, a transverse bar 325 extending inward from a center of a lower part, two sets of two opposite wheel mounts 321; two sets of two through holes 324; and two axles 323 each pivotably driven through either set of the through holes 324 to mount a caster 322 between the opposite wheel mounts 321 of either set; and four brace plates 37 each threadedly fastened between two adjacent upright portions of the right leg structure 31, two adjacent upright portions of the left leg structure 32, or one upright portion of the right leg structure 31 and one adjacent upright portion of the left leg structure 32. The transverse bars 314, 325 are threadedly secured together by using a fastener 4. The bracket 311 has a first through hole 312 at a distal end relative to the right leg structure 31, and a second through hole 313 at a proximate end relative to the right leg structure 31. It is noted that the provision of the brace plates 37 renders the base 3 sturdy.

The base 3 further includes a foot pedal 34 including two flanks 341 at both sides respectively, and two holes 342 through the flanks 341 respectively; and a pivot pin 345 driven through the first through holes 312 and the holes 342 to pivotably fasten the foot pedal 34 and the brackets 311 together. The flank 341 has a straight edge 343 and a cam edge 344 with the hole 342 formed through. The base 3 further includes a rectangular urging plate 36 having two holes 361 at two inner corners respectively. A pin 362 is driven through the second through holes 313 and the holes 361 to pivotably fasten the urging plate 36 and the brackets 311 together. The base 3 further includes a wheel 35 secured to a bottom of the urging plate 36 by using fasteners. Thus, the wheel 35 and the urging plate 36 can operate as a whole.

Figure 5:
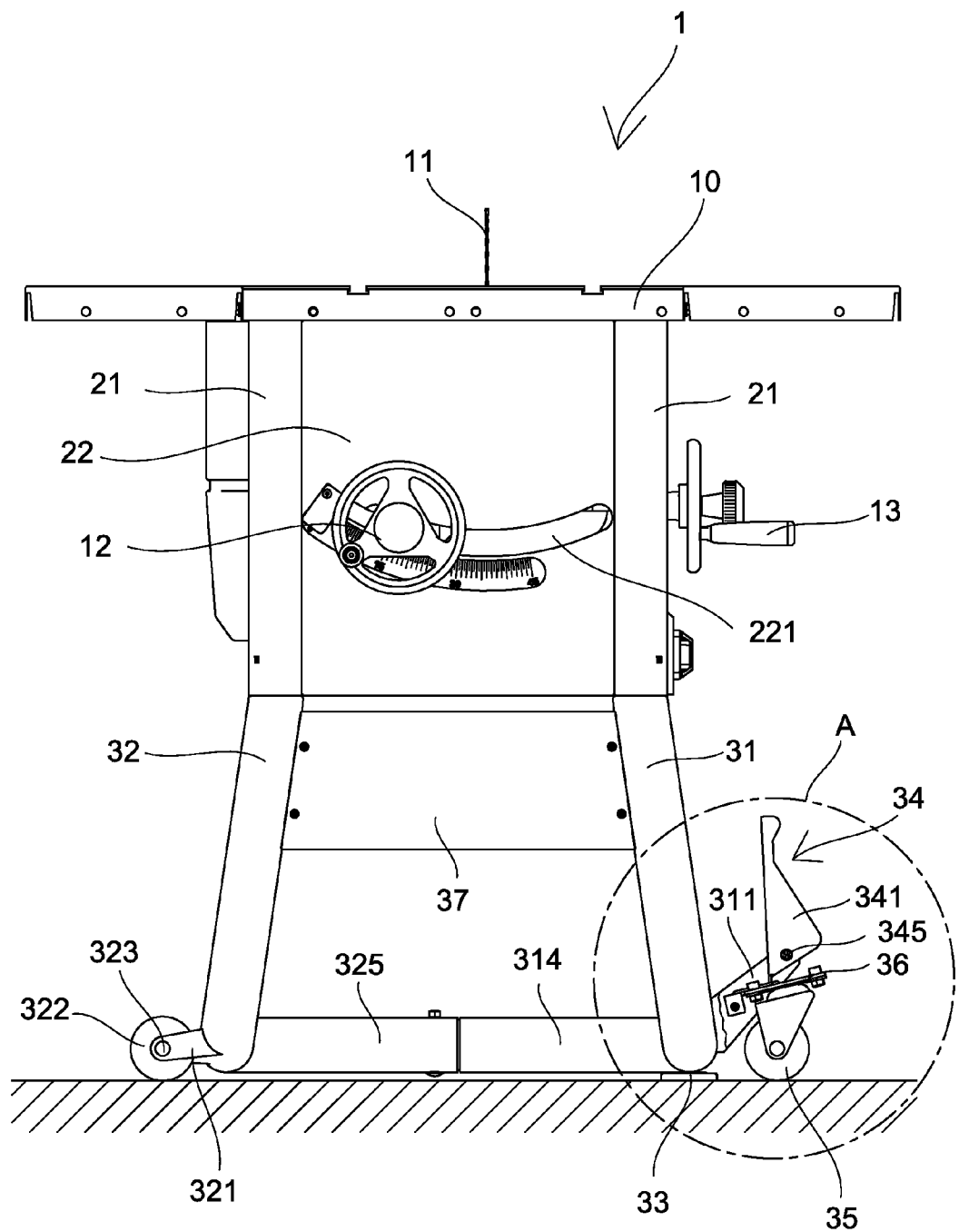
FIG. 5 is a front view of the mobile table saw.
Figure 5A:
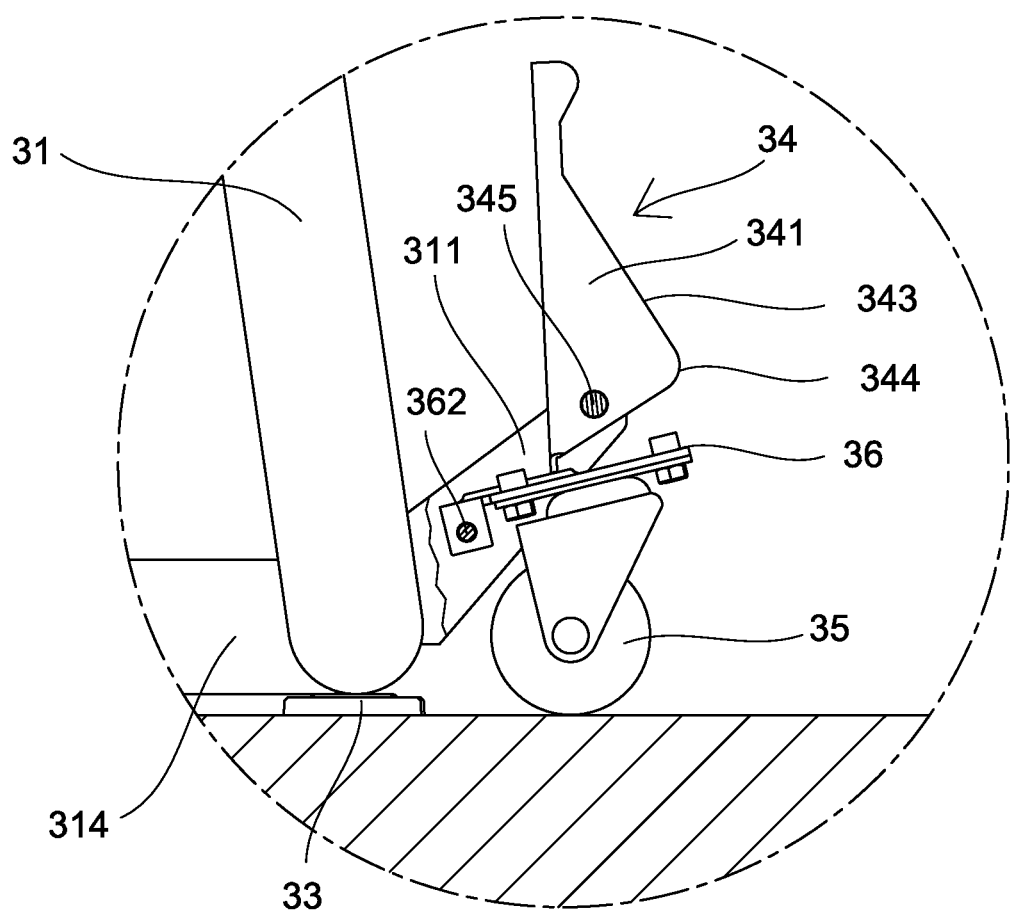
FIG. 5A is a detailed view of the area in circle A of FIG. 5 where the foot pedal is upright and the mobile table saw is ready to operate.
Figure 6:
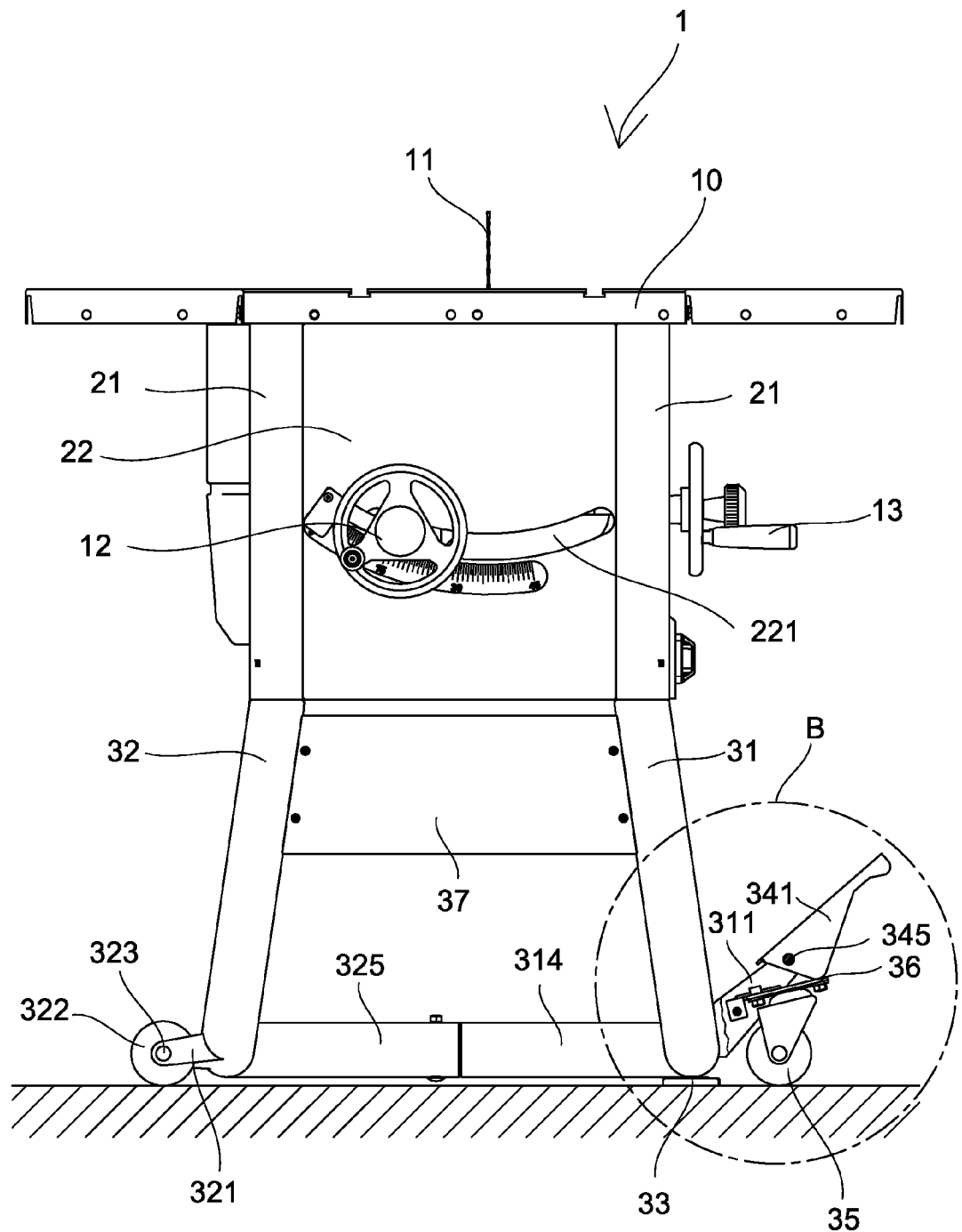
FIG. 6 is a view similar to FIG. 5 where the foot pedal is being pivoted clockwise about 45 degrees from the position of FIG. 5 as a first step prior to moving the mobile table saw.
Figure 6A:
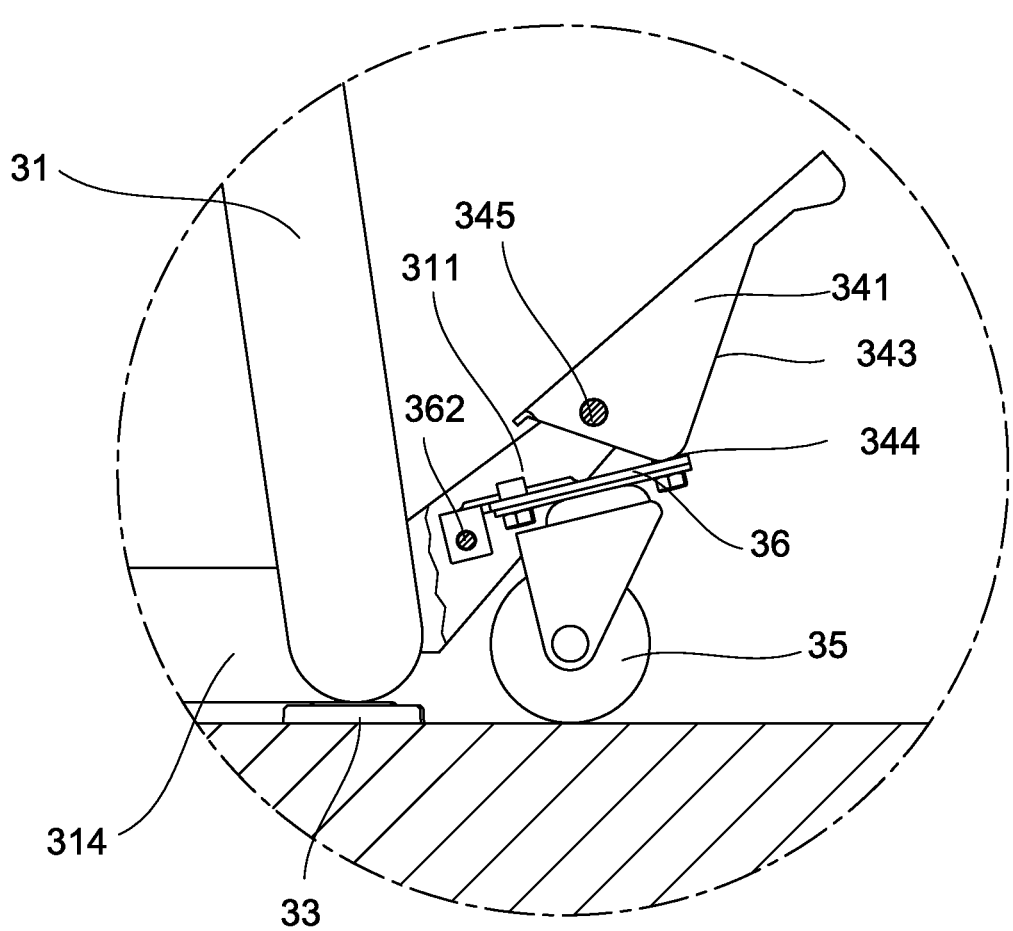
FIG. 6A is a detailed view of the area in circle B of FIG. 6.
Figure 7:
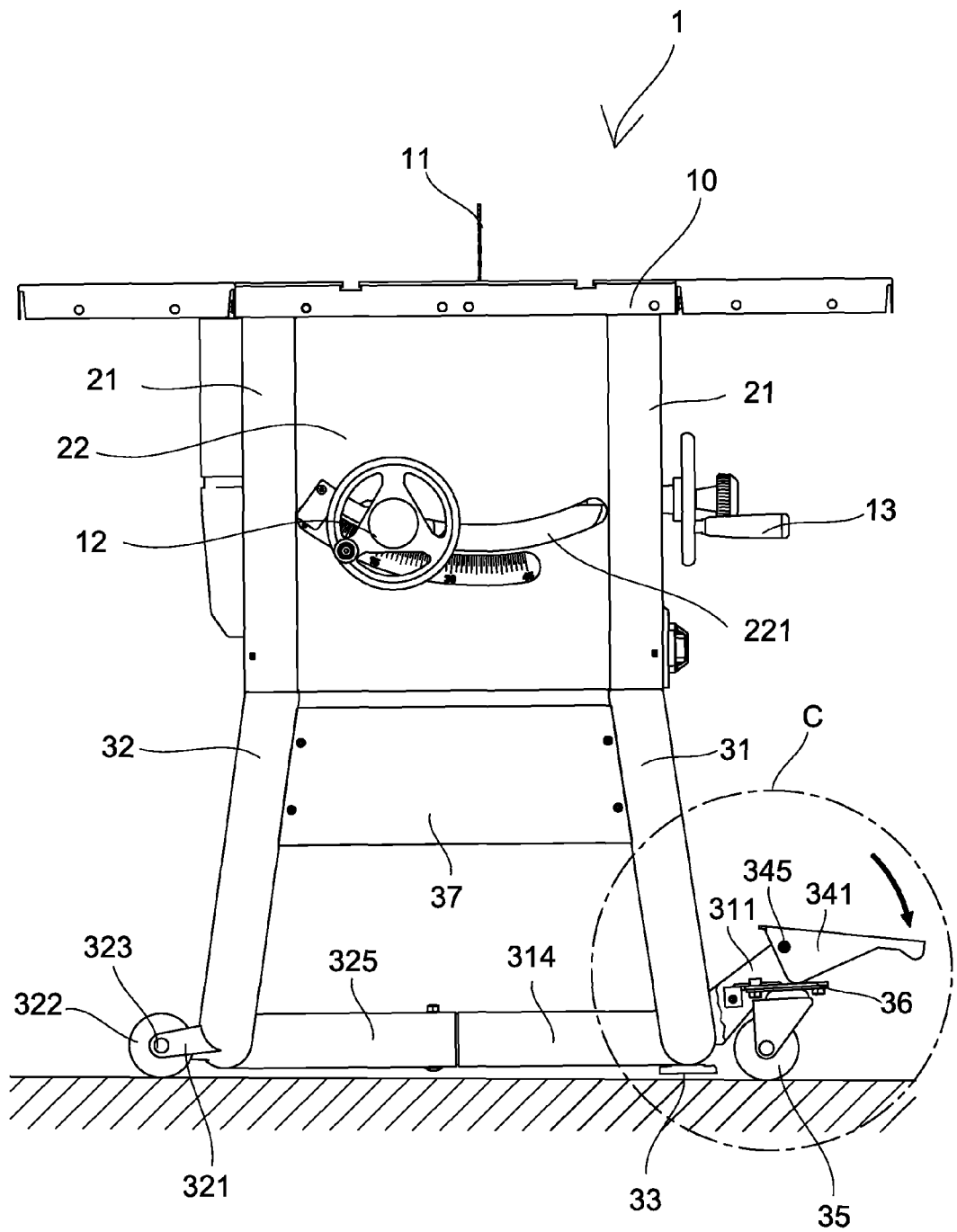
FIG. 7 is a view similar to FIG. 6 where the foot pedal is being further pivoted clockwise about 45 degrees from the position of FIG. 6 as a second step prior to moving the mobile table saw.
Figure 7A:
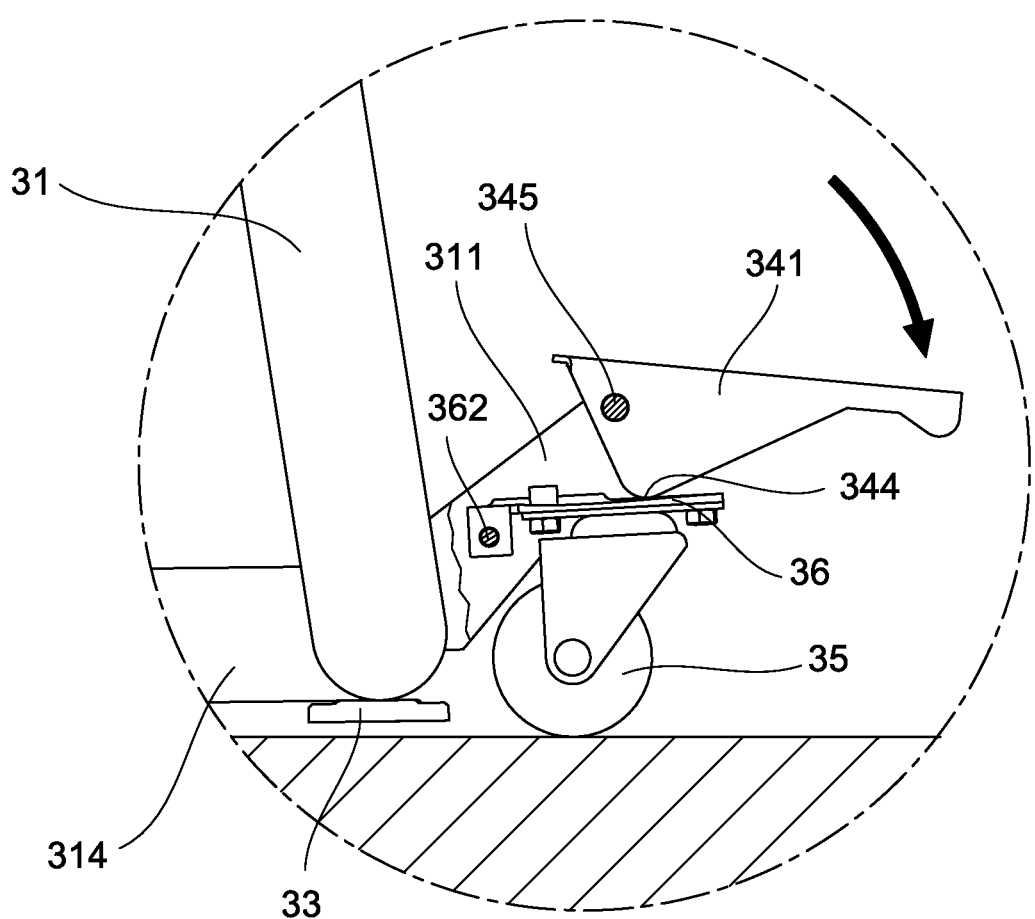
FIG. 7A is a detailed view of the area in circle C of FIG. 7.
Figure 8:
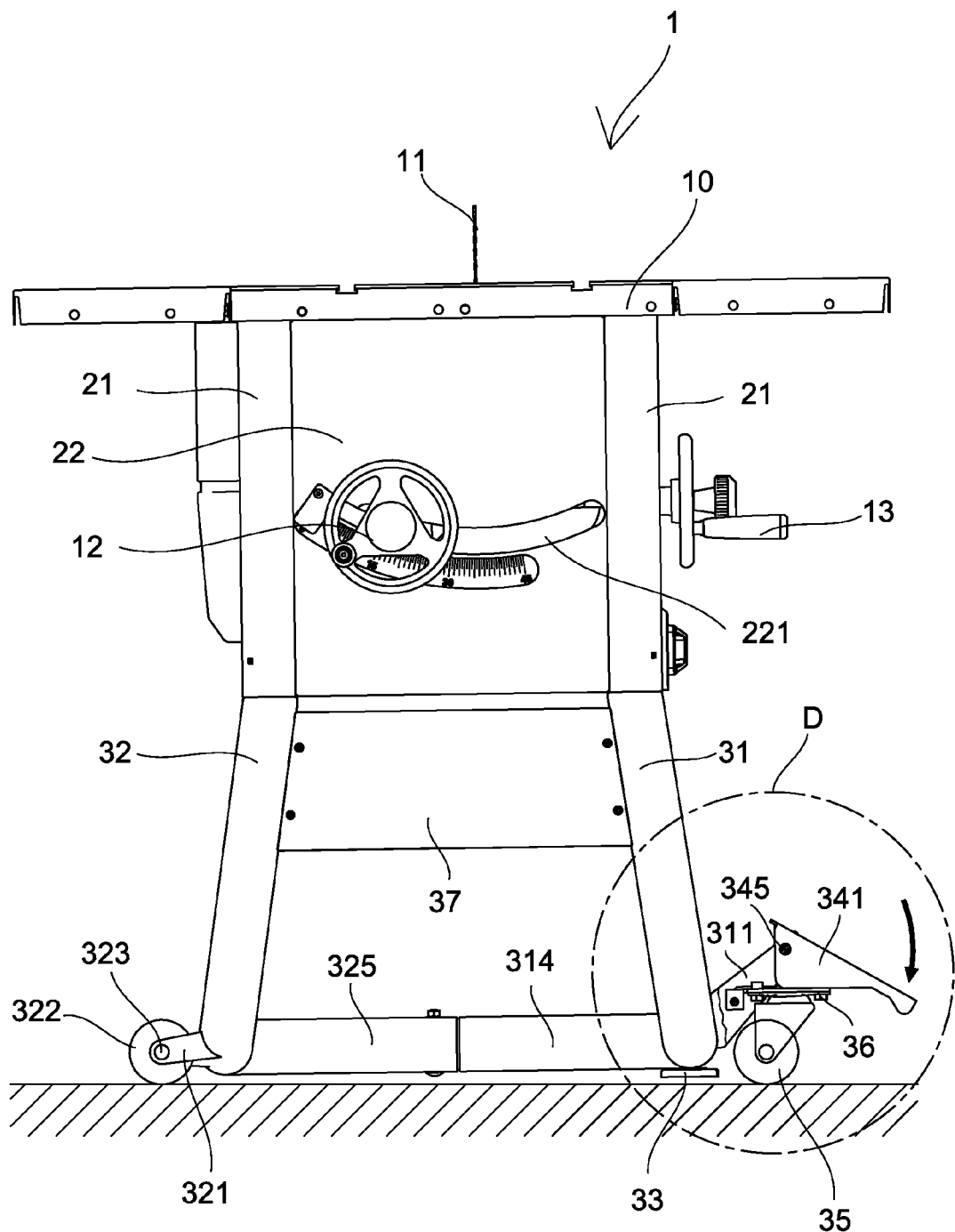
FIG. 8 is a view similar to FIG. 7 where the foot pedal is being further pivoted clockwise about 45 degrees from the position of FIG. 7 to be locked as a third, final step.
Figure 8A:
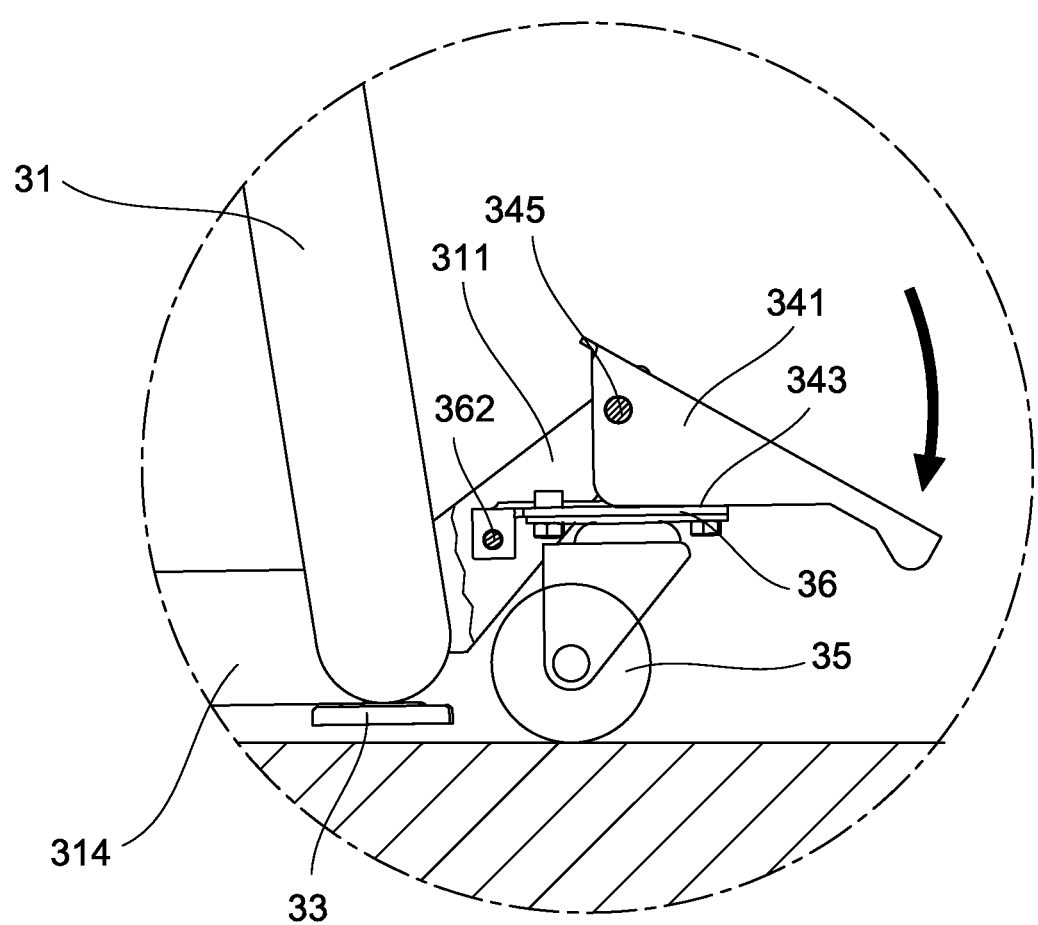
FIG. 8A is a detailed view of the area in circle D of FIG. 7 where the feet have been lifted above the ground and the mobile table saw is ready to move.

Operation of the invention will be described in detail below. The mobile table saw 1 is in a ready to operate position with the casters 322, the feet 33, and the wheel 35 rested on the ground and the foot pedal 34 upright (see FIGS. 5 and 5A). For moving the mobile table saw 1, an individual may clockwise pivot the foot pedal 34 about the wheel 35 with the cam edges 344 inwardly riding on the urging plate 36 (see FIGS. 6, 6A, 7, and 7A) until a portion of the straight edges 343 is rested on the urging plate 36 and the feet 33 are lifted above the ground (see FIGS. 8 and 8A). Thereafter, the mobile table saw 1 can be wheeled.

While the invention has been described in terms of preferred embodiments, those skilled in the art will recognize that the invention can be practiced with modifications within the spirit and scope of the appended claims.

What is claimed is:

1. A table saw (1) comprising:
    a stand (2) including four upright members (21), a front panel (22), a rear panel (23), a right panel (24), and a left panel (25), each of the front, rear, right, and left panels (22, 23, 24, 25) fastened between any two adjacent upright members (21);
    an elevating mechanism (12) mounted on a curved slot (221) of the front panel (22);
    a rotating mechanism (13) mounted on the right panel (24);
    an upper cutting surface (10) mounted on the stand (2);
    a circular saw blade (11) extending upward from the upper cutting surface (10);
    a base (3) mounted under the stand (2), the base (3) including a first leg assembly (31) having a transverse bar (314) extending inward from a center of a lower part, a second leg assembly (32) having a transverse bar (325) extending inward from a center of a lower part, the transverse bar (325) being threadedly secured to the transverse bar (314), a first wheel assembly (35) pivotably secured to the first leg assembly (31), and at least two second wheel assemblies (322) secured to the second leg assembly (32); and
    a foot pedal (34) including two side flanks (341) pivotably secured to the first leg assembly (31), each of the side flanks (341) having a straight edge (343) and a cam edge (344);
    wherein the first and second wheel assemblies (35, 322) and a portion of the first and second leg assemblies (31, 32) are rested on a supporting surface in a ready to use position; and
    wherein clockwise rotation of the foot pedal (34) about the first wheel assembly (35) inward moves the cam edges (344) on a top of the first wheel assembly (35) until portions of the straight edges (343) engage the top of the first wheel assembly (35) and the portion of the first and second leg assemblies (31, 32) is lifted to a ready to move position.

\* \* \* \* \*